(12) United States Patent
Fukai et al.

(10) Patent No.: US 11,644,627 B2
(45) Date of Patent: May 9, 2023

(54) OPTICAL CONNECTOR CLEANING TOOL AND OPTICAL CONNECTOR CLEANING METHOD

(71) Applicant: NIPPON TELEGRAPH AND TELEPHONE CORPORATION, Tokyo (JP)

(72) Inventors: Chisato Fukai, Musashino (JP); Masaaki Takaya, Musashino (JP); Yoshiteru Abe, Musashino (JP); Ryo Koyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 224 days.

(21) Appl. No.: 17/282,981

(22) PCT Filed: Sep. 25, 2019

(86) PCT No.: PCT/JP2019/037459
§ 371 (c)(1),
(2) Date: Apr. 5, 2021

(87) PCT Pub. No.: WO2020/075497
PCT Pub. Date: Apr. 16, 2020

(65) Prior Publication Data
US 2021/0341684 A1 Nov. 4, 2021

(30) Foreign Application Priority Data
Oct. 9, 2018 (JP) .............................. JP2018-191190

(51) Int. Cl.
*B08B 1/00* (2006.01)
*G02B 6/38* (2006.01)

(52) U.S. Cl.
CPC ............ *G02B 6/3866* (2013.01); *B08B 1/006* (2013.01); *B08B 2240/02* (2013.01)

(58) Field of Classification Search
None
See application file for complete search history.

(56) References Cited

U.S. PATENT DOCUMENTS

| 6,047,716 A | 4/2000 | Shimoji et al. |
| 2001/0033728 A1 | 10/2001 | Miyake et al. |

(Continued)

FOREIGN PATENT DOCUMENTS

| CN | 105803638 A | * 7/2016 | |
| FR | 2702222 A1 | * 9/1994 | .......... D03D 25/005 |

(Continued)

*Primary Examiner* — Eric W Golightly

(57) ABSTRACT

An object is to provide an optical connector cleaning tool capable of cleaning both an end face and a side face of a ferrule of an optical connector plug simultaneously and simply and a method of cleaning an optical connector in such a manner. An optical connector cleaning tool according to the present invention includes superimposing a plurality of cleaning sheets on each other, the cleaning sheets each including a plurality of cleaning strings arranged so as to be parallel to each other in a sheet shape, such that orientations of the cleaning strings included in the respective cleaning sheets differ from each other, pressing an end face of a ferrule of an optical connector plug against the cleaning sheets to clean the end face of the ferrule, and subsequently, sticking the ferrule through the cleaning sheets to clean a side face of the ferrule.

3 Claims, 5 Drawing Sheets

PRESS END FACE OF FERRULE OF OPTICAL CONNECTOR PLUG AGAINST SHEETS OF CLEANING STRINGS SUPERIMPOSED ON EACH OTHER IN LAYERS TO CLEAN END FACE OF FERRULE — S1

STICK FERRULE OF OPTICAL CONNECTOR PLUG THROUGH CLEANING SHEETS COMPOSED OF CLEANING STRINGS SUPERIMPOSED ON EACH OTHER IN LAYERS TO CLEAN SIDE FACE OF FERRULE — S2

INSERT OPTICAL CONNECTOR PLUG INTO OPTICAL CONNECTOR ADAPTER TO CONNECT OPTICAL CONNECTOR — S3

(56) References Cited

U.S. PATENT DOCUMENTS

2002/0166190 A1 11/2002 Miyake et al.
2011/0047731 A1 3/2011 Sugita et al.

FOREIGN PATENT DOCUMENTS

| JP | H10227943 A | 8/1998 |
|---|---|---|
| JP | 2001246343 A | 9/2001 |
| JP | 2005258473 A | 9/2005 |
| WO | WO-2009119437 A1 | 10/2009 |

* cited by examiner

FIG. 1

PRESS END FACE OF FERRULE OF OPTICAL CONNECTOR PLUG AGAINST SHEETS OF CLEANING STRINGS SUPERIMPOSED ON EACH OTHER IN LAYERS TO CLEAN END FACE OF FERRULE ~S1

STICK FERRULE OF OPTICAL CONNECTOR PLUG THROUGH CLEANING SHEETS COMPOSED OF CLEANING STRINGS SUPERIMPOSED ON EACH OTHER IN LAYERS TO CLEAN SIDE FACE OF FERRULE ~S2

INSERT OPTICAL CONNECTOR PLUG INTO OPTICAL CONNECTOR ADAPTER TO CONNECT OPTICAL CONNECTOR ~S3

FIG. 2

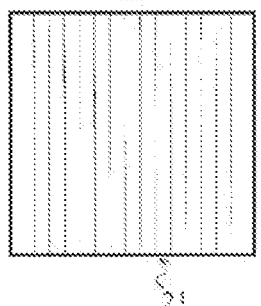
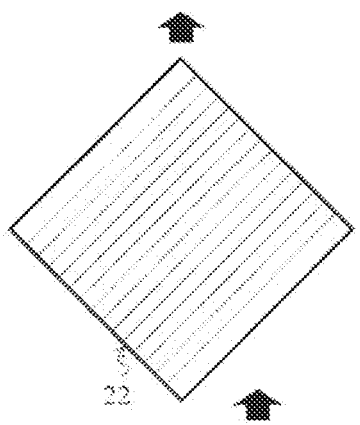
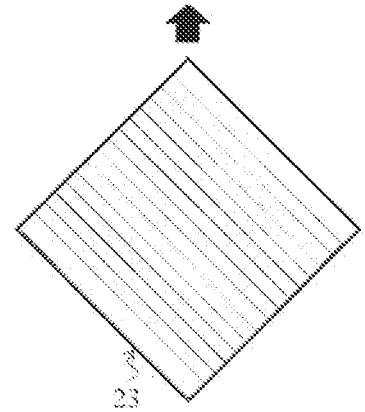
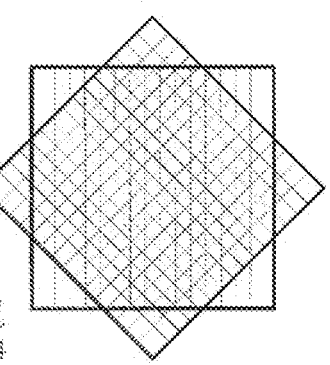

OPTICAL CONNECTOR CLEANING TOOL AND OPTICAL CONNECTOR CLEANING METHOD

CROSS-REFERENCE TO RELATED APPLICATIONS

This application is a 371 U.S. National Phase of International Application No. PCT/JP2019/037459 filed on Sep. 25, 2019, which claims priority to Japanese Application No. 2018-191190 filed on Oct. 9, 2018. The entire disclosures of the above applications are incorporated herein by reference.

TECHNICAL FIELD

The present disclosure relates to an optical connector cleaning tool for removing foreign matter adhering to an end face and a side face of a ferrule of an optical connector plug and to a method of cleaning an optical connector for such a purpose.

BACKGROUND ART

Currently, information is communicated through optical communications networks using optical fibers. In the optical communications network wiring, optical connectors are used to connect optical fibers together. A method of connection using optical connectors involves inserting optical connector plugs into an optical connector adapter from both sides. End faces of ferrules of a pair of the optical connector plugs inserted into the optical connector adapter from both sides come into intimate contact with each other and thus fiber end faces of optical fibers built in the respective ferrules come into intimate contact with each other to enable transmission of optical signals.

A main form of connection using optical connectors is connection by an optical transmitter-receiver device. In the optical transmitter-receiver device, an optical connector adapter is disposed on a housing of the optical transmitter-receiver device, and one optical connector plug coming from an inside of the optical transmitter-receiver device is built in the optical connector adapter. Another optical connector plug for use in connection is inserted in the optical connector adapter having the built-in optical connector plug. End faces of ferrules of the optical connector plugs come into intimate contact with each other inside the optical connector adapter and thus fiber end faces of optical fibers built in the respective ferrules come into intimate contact with each other to enable transmission of optical signals.

The method of connection using optical connectors encounters a deterioration of connection quality, such as increased connection loss and increased reflection, if foreign matter adheres to somewhere between the fiber end faces of the optical fibers inserted into the optical connector adapter from both sides. This results in a factor in deteriorating performance of transmission of optical signals.

If foreign matter adheres to an optical fiber core on an end face of a ferrule of an optical connector plug, transmission of high output light by an optical amplifier or other devices causes high output light blocked by the foreign matter to generate heat. This melts an optical fiber together with the foreign matter and deforms a shape of an end face of the fiber. A consequent deterioration of connection quality results in a factor in deteriorating performance of transmission of optical signals. Hence, an optical connector is cleaned when the optical connector is connected.

As a technique for cleaning an optical connector, a known cleaning tool cleans an end face of a ferrule of an optical connector plug using a cleaning sheet (refer to, for example, Patent Literature 1). A known cleaning tool includes a cleaning cloth disposed in a hollow into which a ferrule of an optical connector plug is inserted to clean an end face and a side face of the ferrule of the optical connector plug (refer to, for example, Patent Literature 2). A known cleaning tool cleans an end face of a ferrule of an optical connector by sending a gas from an air nozzle (refer to, for example, Patent Literature 3). A known cleaning tool cleans an end face of a ferrule of each of an optical connector plug and another optical connector plug built in an optical connector adapter using a cleaning string (refer to, for example, Patent Literature 4).

CITATION LIST

Patent Literature

Patent Literature 1: Japanese Patent Laid-Open No. 2001-246343
Patent Literature 2: Japanese Patent Laid-Open No. 2005-258473
Patent Literature 3: Japanese Patent Laid-Open No. 10-227943
Patent Literature 4: International Publication No. WO 2009/119437

SUMMARY OF THE INVENTION

Technical Problem

Unfortunately, a cleaning tool for optical connectors described in Patent Literature 1 cleans only an end face of a ferrule of an optical connector plug. Thus, if dust as foreign matter adheres to a side face of a ferrule of an optical connector plug, it is possible that the dust adhering to the side face of the ferrule is pushed into an optical connector adapter when the optical connector plug is inserted into the optical connector adapter. This may cause the dust to adhere to the end face of the ferrule or a fiber end face of an optical fiber, resulting in a deterioration of connection performance. In other words, the cleaning tool in Patent Literature 1 has a problem of difficulty in cleaning the side face of the ferrule.

Meanwhile, a cleaning tool for optical connectors described in Patent Literature 2 has difficulty in cleaning an end face of a ferrule of an optical connector plug properly if force for pushing the ferrule into a hollow in the optical connector cleaning tool is inadequate at a time when the ferrule is inserted in the hollow. Thus, there is a possibility that foreign matter may remain on the end face of the ferrule. In other words, the cleaning tool in Patent Literature 2 has a problem in usability.

A cleaning tool for optical connectors described in Patent Literature 3 has difficulty in cleaning an end face of a ferrule properly if pressure of a gas emitted from an air nozzle is low. Thus, there is a possibility that dust may remain on the end face of the ferrule. In other words, the cleaning tool in Patent Literature 3 necessitates checking the gas pressure and has a problem in usability.

A cleaning tool for optical connectors described in Patent Literature 4 cleans only an end face of a ferrule of an optical connector plug when the optical connector plug is cleaned. Thus, if dust as foreign matter adheres to a side face of a ferrule of an optical connector plug before insertion of the optical connector plug into an optical connector adapter, it is possible that the dust adhering to the side face of the ferrule is pushed into the optical connector adapter when the optical connector plug is inserted into the optical connector adapter. This may cause the dust to adhere to the end face of the ferrule or a fiber end face of an optical fiber. In other words, the cleaning tool in Patent Literature 4 has a problem of difficulty in cleaning the side face of the ferrule.

Thus, an object of the present invention, which has been proposed in view of the problems described above, is to provide an optical connector cleaning tool capable of cleaning both an end face and a side face of a ferrule of an optical connector plug simultaneously and simply and a method of cleaning an optical connector in such a manner.

Means for Solving the Problem

An optical connector cleaning tool according to the present invention, accomplished to attain the object described above, includes superimposing a plurality of cleaning sheets on each other, the cleaning sheets each including a plurality of cleaning strings arranged so as to be parallel to each other in a sheet shape, such that orientations of the cleaning strings included in the respective cleaning sheets differ from each other, pressing an end face of a ferrule of an optical connector plug against the cleaning sheets to clean the end face of the ferrule, and sticking the ferrule through the cleaning sheets to clean a side face of the ferrule.

Specifically, an optical connector cleaning tool according to the present invention includes:

a cleaning sheet including a plurality of cleaning strings arranged in a row to rub dirt off an end face of a ferrule and a side face of the ferrule; and a fixing tool to hold a plurality of the cleaning sheets that are superimposed on each other such that orientations of the cleaning strings included in the respective cleaning sheets differ from each other.

A method of cleaning an optical connector, according to the present invention, includes:

superimposing a plurality of cleaning sheets on each other in layers, the cleaning sheets each including a plurality of cleaning strings arranged in a row, such that orientations of the cleaning strings included in the respective cleaning sheets differ from each other;

pressing an end face of a ferrule of an optical connector plug against the cleaning strings of the cleaning sheets superimposed on each other in layers to clean the end face of the ferrule; and sticking the ferrule of the optical connector plug through the cleaning sheets superimposed on each other in layers to clean a side face of the ferrule.

The cleaning sheets used in the present invention clean the end face of the ferrule that is being pressed against the cleaning sheets. In addition, the cleaning sheets each including the plurality of the cleaning strings arranged in a row allow the ferrule to be stuck through the cleaning sheets as the cleaning strings move laterally with a small degree of force. Since the cleaning sheets are superimposed on each other such that orientations of the cleaning strings included in the respective cleaning sheets differ from each other, the cleaning strings in the different cleaning sheets come into contact with different places on the side face of the ferrule. This enables the cleaning strings to clean the entire side face of the ferrule. In other words, after the end face of the ferrule is cleaned by pressing the end face of the ferrule against the cleaning sheets, the ferrule left as it is can be stuck through the cleaning sheets by applying a small degree of force to also clean the side face of the ferrule. This makes cleaning work simple.

Consequently, the present invention can provide an optical connector cleaning tool capable of cleaning both an end face and a side face of a ferrule of an optical connector plug simultaneously and simply and a method of cleaning an optical connector in such a manner.

For instance, the cleaning sheets of the optical connector cleaning tool according to the present invention each include a frame having a polygonal shape to arrange the plurality of the cleaning strings in a row and in a sheet shape, the fixing tool has cuts that are each configured to fit onto a corner of the frame of each of the cleaning sheets, a number of the cuts amounting to a multiple of a number of the corners of the frame, and the plurality of the cleaning sheets are superimposed on each other such that the cuts fitting onto the corners of the respective frames differ in position to cause orientations of the cleaning strings included in the respective cleaning sheets to differ from each other.

In this context, in the method of cleaning an optical connector according to the present invention, the plurality of the cleaning strings are arranged in a row by a frame having a polygonal shape to form each of the cleaning sheets, and with a fixing tool having cuts that are each configured to fit onto a corner of the frame of each of the cleaning sheets, a number of the cuts amounting to a multiple of a number of the corners of the frame, the plurality of the cleaning sheets are superimposed on each other such that the cuts fitting onto the corners of the respective frames differ in position to cause orientations of the cleaning strings included in the respective cleaning sheets to differ from each other.

The fixing tool of the optical connector cleaning tool according to the present invention has a ring structure to hold the cleaning sheets superimposed on each other inside a ring, the ring structure has a closed state in which the cleaning sheets are held and a release state in which the cleaning sheets are allowed to be removed, and the frame of each of the cleaning sheets is preferably released in an interlocked manner when the ring structure gets into the release state.

In this context, the method of cleaning an optical connector, according to the present invention, includes: releasing the fixing tool after cleaning the side face of the ferrule to let the frame of each of the cleaning sheets be released together with the release of the fixing tool; and removing the fixing tool and the cleaning sheets from the ferrule of the optical connector plug stuck through the cleaning sheets.

With the optical connector plug being stuck into the cleaning sheets, when a holder lets the fixing tool be opened, the cleaning sheets are separated from the fixing tool, and the frames fixing the cleaning strings are opened. This allows the optical connector cleaning tool to be readily removed from the optical connector plug.

Effects of the Invention

The present invention can provide an optical connector cleaning tool capable of cleaning both an end face and a side face of a ferrule of an optical connector plug simultaneously and simply and a method of cleaning an optical connector in such a manner.

BRIEF DESCRIPTION OF DRAWINGS

FIG. 1 is a flowchart illustrating a method of cleaning an optical connector according to the present invention.

FIG. 2 is a schematic view illustrating an example of a disposition of cleaning sheets included in an optical connector cleaning tool according to the present invention.

DESCRIPTION OF EMBODIMENTS

Figure 3:
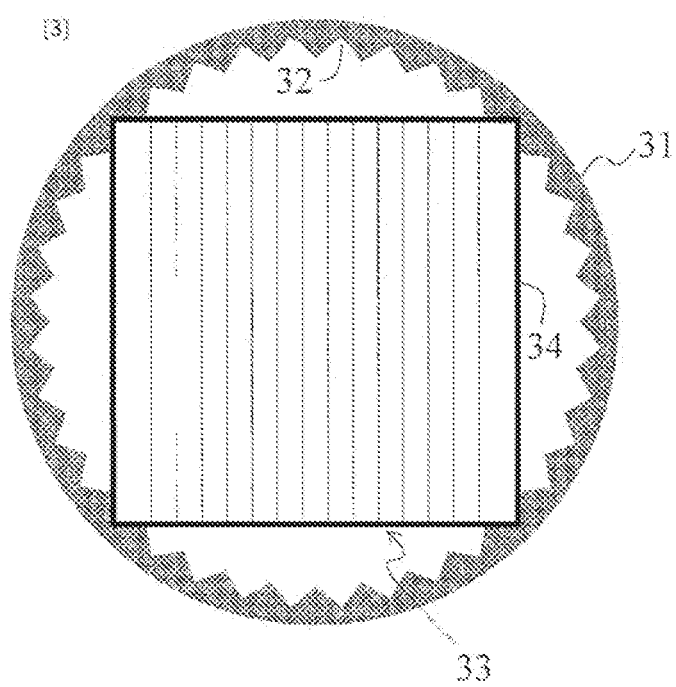
FIG. 3 is a drawing illustrating an example of a fixing tool included in an optical connector cleaning tool according to the present invention.

An optical connector cleaning tool and a method of cleaning an optical connector according to an embodiment of the present invention will be described with reference to the drawings.

(First embodiment) FIG. 1 is a flowchart illustrating a process for connecting an optical connector to an optical transmitter-receiver device by using a method of cleaning an optical connector according to the present embodiment. A method of cleaning an optical connector, according to the present embodiment, includes: superimposing a plurality of cleaning sheets on each other in layers, the cleaning sheets each including a plurality of cleaning strings arranged in a row, such that orientations of the cleaning strings included in the respective cleaning sheets differ from each other; pressing an end face of a ferrule of an optical connector plug against the cleaning strings of the cleaning sheets superimposed on each other in layers to clean the end face of the ferrule; and sticking the ferrule of the optical connector plug through the cleaning sheets superimposed on each other in layers to clean a side face of the ferrule.

In the method of cleaning an optical connector, according to the present embodiment, the end face of the ferrule of the optical connector plug is pressed against sheets of the cleaning strings superimposed on each other in layers first to clean the end face of the ferrule (step S1). The cleaning strings may be made of both of or any one of a natural fiber and a chemical fiber. However, a fiber other than these fibers may be used, provided that the fiber produces an effect of removing dust adhering to the end face of the ferrule of the optical connector plug. A lint-free fiber that produces no waste threads during wiping may be used. An antistatic conductive fiber may be used as a material to prevent the dust from adhering again due to static electricity or other reason.

A plurality of the cleaning strings is bunched together and is woven or knit to be formed into a sheet. A cleaning sheet composed of the cleaning strings is made into a size such that the optical connector plug is allowed to be pressed against and be wiped with the cleaning sheet to remove dust. The cleaning sheet may be formed by any way of weaving or knitting, provided that a thickness of the cleaning sheet is uniform and the optical connector ferrule is allowed to be stuck through the cleaning sheet.

Next, the ferrule of the optical connector plug is stuck through the cleaning sheets composed of the cleaning strings superimposed on each other in layers to clean the side face of the ferrule (step S2). The layered cleaning sheets are two or more sheets and are disposed such that the layers have respective weaves or stitches that are not equal in orientation. This enables the cleaning strings to be put into contact with the entire side face of the ferrule of the optical connector plug and clean the entire side face of the ferrule.

Next, the optical connector plug is inserted into an optical connector adapter disposed on a housing of an optical transmitter-receiver device to connect the optical connector (step S3).

The optical connector cleaning tool used in steps S1 and S2 in FIG. 1 includes: a cleaning sheet including a plurality of cleaning strings arranged in a row to rub dirt off an end face of a ferrule and a side face of the ferrule; and a fixing tool to hold a plurality of the cleaning sheets that are superimposed on each other such that orientations of the cleaning strings included in the respective cleaning sheets differ from each other.

FIG. 2 is a drawing illustrating an example of a disposition of cleaning sheets in layers. In FIG. 2, weaves or stitches in a cleaning sheet 21 are oriented in a vertical direction with an arrow placed at the top. Weaves or stitches in a cleaning sheet 22 are oriented in a diagonally upper right-diagonally lower left direction with an arrow placed at the top. Weaves or stitches in a cleaning sheet 23 are oriented in a diagonally upper left-diagonally lower right direction with an arrow placed at the top. The cleaning sheets 21, 22, and 23 are superimposed on one another such that the arrows are equal in orientation. This enables the formation of a cleaning sheet 24 having a plurality of layers that are disposed such that the layers have respective weaves or stitches that are not equal in orientation. In an example shown in FIG. 2, a number of the cleaning sheets is three. However, the number of the cleaning sheets is not limited to three. A configuration including the number of the cleaning sheets and weaves or stitches in the disposed sheets may vary, provided that the configuration enables the cleaning strings to be put into contact with the entire side face of the ferrule of the optical connector plug and clean the entire side face of the ferrule.

FIG. 3 is a drawing illustrating an example of a fixing tool used to hold layered cleaning sheets. A cleaning sheet 33 has a square frame 34 to arrange a plurality of the cleaning strings in a row and in a sheet shape. A fixing tool 31 has cuts 32 that are each configured to fit onto a corner of the frame 34 of the cleaning sheet 33, with a number of the cuts 32 amounting to a multiple of 4. A plurality of the cleaning sheets 33 are superimposed on each other such that the cuts 32 fitting onto the corners of the respective frames 34 differ in position to cause orientations of the cleaning strings included in the respective cleaning sheets to differ from each other.

The cuts 32 are formed in an inside of the fixing tool 31 having a round shape, and the cleaning sheet 33 having a square shape is disposed so as to fit into the cuts 32. The frames 34 of the plurality of the cleaning sheets are disposed so as to fit into the respective cuts 32 that differ in position. This enables a disposition of a plurality of layers of the cleaning sheets such that the layers have respective weaves or stitches that are not equal in orientation. An external shape of the fixing tool may be any shape other than the round shape, provided that cuts are formed in an inside of the fixing tool and the cleaning sheet is disposed so as to fit into the cuts. The cleaning sheet may have any polygonal shape other than the square shape, provided that corners of the polygonal shape fit into the cuts formed in the inside of the fixing tool and the polygonal shape is thereby secured with the fixing tool.

The shape of the fixing tool may be held by a holder. A fixing tool 41 has a ring structure to hold superimposed cleaning sheets 43 inside a ring. The ring structure has a closed state in which the cleaning sheets 43 are held and a release state in which the cleaning sheets 43 are allowed to be removed.

Figure 4:
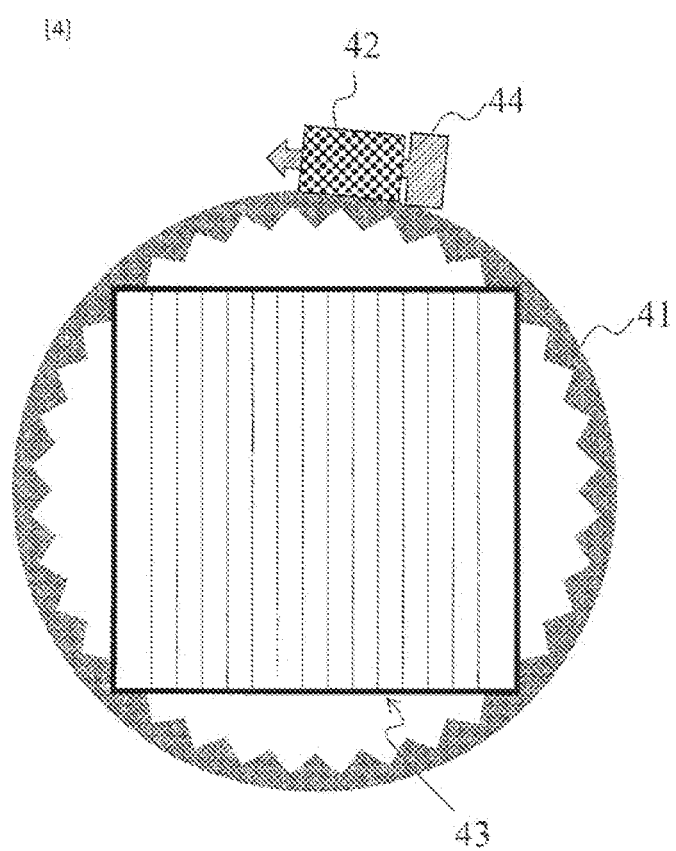
FIG. 4 is a drawing illustrating an example of a fixing tool included in an optical connector cleaning tool according to the present invention.
Figure 5:
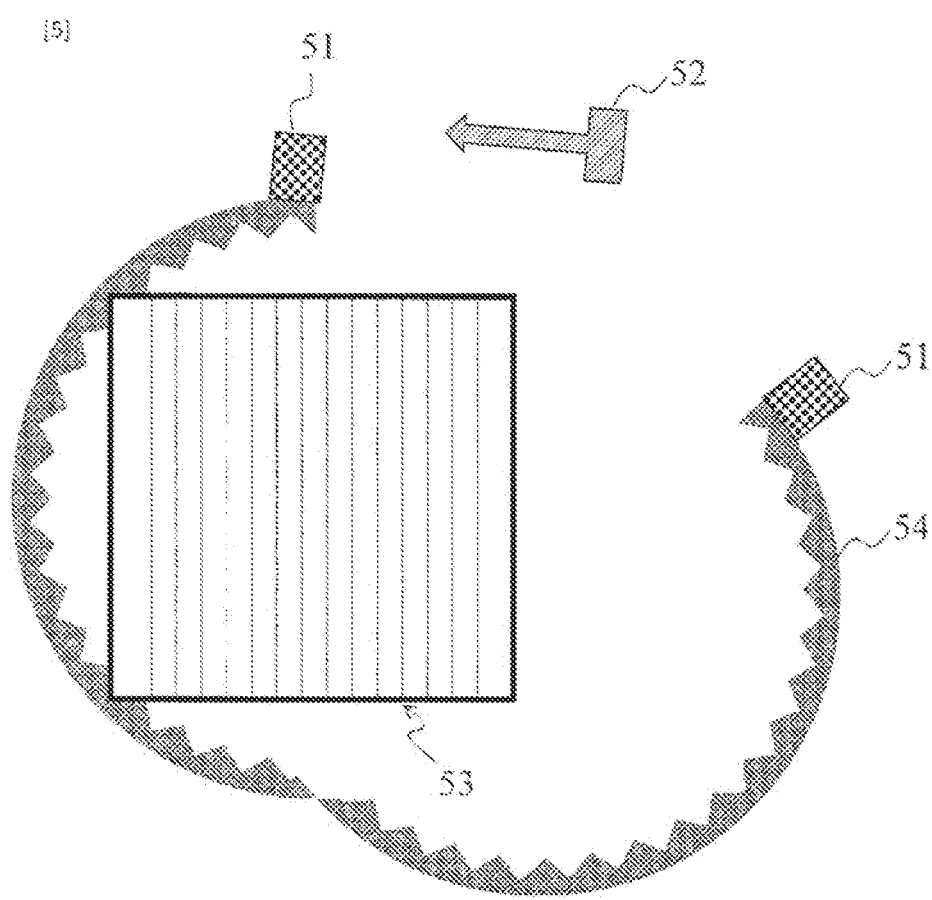
FIG. 5 is a drawing illustrating example operation of a fixing tool included in an optical connector cleaning tool according to the present invention.

FIG. 4 is a drawing illustrating an example of a holder 42 for the fixing tool 41 and is a drawing illustrating a state in which the holder 42 holds the fixing tool 41. The holder 42 is attached to an outside of the fixing tool 41, which has a round shape, to hold the fixing tool. A holding method used by the holder is, for example, a screw 44. However, the holding method may be any method, other than the screw, provided that the holding method enables the holder to hold the fixing tool. The holder 42 that is in a holding state (for a screw, for example, the screw 44 is tightened) is able to fix the cleaning sheets 43. Meanwhile, FIG. 5 is a drawing illustrating a state in which the holder lets a fixing tool be opened. When a holder 51 is in an open state (for a screw, for example, a screw 52 is loosened), a cleaning sheet 53 can be separated from a fixing tool 54.

Figure 6:
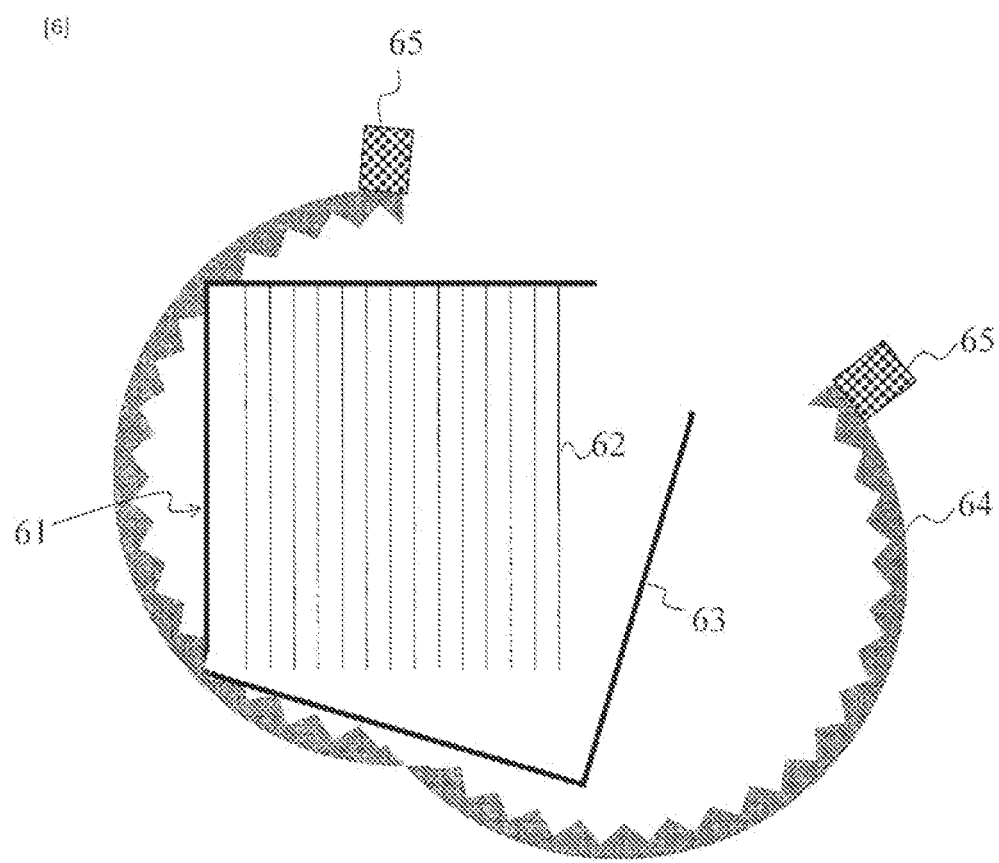
FIG. 6 is a drawing illustrating example operation of a fixing tool and a cleaning sheet included in an optical connector cleaning tool according to the present invention.

A frame 63 of a cleaning sheet 61 is released in an interlocked manner when the ring structure gets into a release state. FIG. 6 illustrates a state in which the frame 63 for fixing cleaning strings 62 is opened in the cleaning sheet 61.

For instance, the frame 63 for fixing the cleaning strings 62 is also designed to be fixed by holding a holder 65 of a fixing tool 64. This enables the frame 63 fixing the cleaning strings to be opened simultaneously with separation of the cleaning sheet 61 from the fixing tool 64 by opening the holder 65 of the fixing tool 64.

In steps S1 and S2 in FIG. 1, the optical connector plug is cleaned using the optical connector cleaning tool and in step S2, the optical connector plug is stuck into the layered cleaning sheets. In this state, when the holder 65 of the fixing tool 64 is opened, the cleaning sheet 61 is separated from the fixing tool 64 and simultaneously, the frame 63 fixing the cleaning strings 62 is opened. This allows the optical connector cleaning tool to be readily removed from the optical connector plug.

[Additional remark] The following is a description of an optical connector cleaning tool and a method of cleaning an optical connector according to the present embodiment.

(Aim) An object of the present invention is to clean both an end face and a side face of a ferrule of an optical connector plug simultaneously and simply.

(Means) An optical connector cleaning tool according to the present invention is an optical connector cleaning tool that cleans both an end face and a side face of a ferrule of an optical connector plug and that includes a plurality of cleaning strings arranged so as to form a sheet shape, wherein sheets of the cleaning strings are superimposed on each other in a plurality of layers.

The cleaning strings arranged so as to form a sheet shape is fixed such that a thickness of a sheet of the cleaning strings is uniform.

Sheets of the cleaning strings, which are arranged so as to form a sheet shape, are superimposed on each other in layers such that orientations of the cleaning strings included in the respective sheets differ from each other.

A method of cleaning an optical connector, according to the present invention, includes: a first step of pressing an end face of a ferrule of an optical connector plug against sheets of cleaning strings superimposed on each other in layers to clean the end face of the ferrule; and a second step of sticking the ferrule of the optical connector plug through the cleaning sheets composed of the cleaning strings superimposed on each other in layers to clean the side face of the ferrule of the optical connector plug. The first step and the second step are performed in this order.

Work in the first and the second steps is performed using the optical connector cleaning tool according to any one of claims 1 to 3.

(Effect) According to the optical connector cleaning tool and the method of cleaning an optical connector according to the present invention, an optical connector cleaning tool can be provided that can clean both an end face and a side face of a ferrule of an optical connector plug simultaneously and properly by removing dust and other foreign matter adhering to the end face and the side face of the ferrule of the optical connector plug using sheets of cleaning strings superimposed on each other in layers. The foreign matter other than dust is, for example, oily dirt from hands.

According to the optical connector cleaning tool according to the present invention, an optical connector cleaning tool of the present invention can be attached in advance to an optical connector adapter into which an optical connector plug is not inserted in advance to produce an effect of preventing dust from adhering to an interior of the optical connector adapter.

INDUSTRIAL APPLICABILITY

An optical connector cleaning tool and a method of cleaning an optical connector according to the present invention enable cleaning of both an end face and a side face of a ferrule of an optical connector plug simultaneously and properly. Thus, this technique can be usefully applied to connection of optical fibers by an optical connector in an optical communications network wiring.

REFERENCE SIGNS LIST

21, 22, 23, 24, 33, 43, 53, 61 cleaning sheet
31, 41, 54, 64 fixing tool
32 cut
42, 51, 65 holder
44, 52 screw
62 cleaning string
34, 63 frame

The invention claimed is:

1. A method of cleaning an optical connector, the method comprising:
   superimposing a plurality of cleaning sheets on each other in layers, the cleaning sheets each including a plurality of cleaning strings arranged in a row, such that orientations of the cleaning strings included in the respective cleaning sheets differ from each other;
   pressing an end face of a ferrule of an optical connector plug against the cleaning strings of the cleaning sheets superimposed on each other in layers to clean the end face of the ferrule; and
   sticking the ferrule of the optical connector plug through the cleaning sheets superimposed on each other in layers to clean a side face of the ferrule.

2. The method of cleaning an optical connector according to claim 1, wherein the plurality of the cleaning strings are arranged in a row by a frame having a polygonal shape to form each of the cleaning sheets, and
   wherein with a fixing tool having cuts that are each configured to fit onto a corner of the frame of each of the cleaning sheets, a number of the cuts amounting to a multiple of a number of the corners of the frame, the plurality of the cleaning sheets are superimposed on each other such that the cuts fitting onto the corners of the respective frames differ in position to cause orientations of the cleaning strings included in the respective cleaning sheets to differ from each other.

3. The method of cleaning an optical connector according to claim 2, the method further comprising:
    releasing the fixing tool after cleaning the side face of the ferrule to let the frame of each of the cleaning sheets be released together with the release of the fixing tool; and
    removing the fixing tool and the cleaning sheets from the ferrule of the optical connector plug stuck through the cleaning sheets.

* * * * *